United States Patent
Choi et al.

(10) Patent No.: US 10,010,861 B2
(45) Date of Patent: Jul. 3, 2018

(54) POLYMERIC AMINE BASED CARBON DIOXIDE ADSORBENTS

(71) Applicant: KOREA ADVANCED INSTITUTE OF SCIENCE AND TECHNOLOGY, Daejeon (KR)

(72) Inventors: Min Kee Choi, Daejeon (KR); Woo Sung Choi, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 15/644,924

(22) Filed: Jul. 10, 2017

(65) Prior Publication Data

US 2018/0008958 A1    Jan. 11, 2018

(30) Foreign Application Priority Data

Jul. 8, 2016  (KR) .......................... 10-2016-0086889

(51) Int. Cl.
| | | |
|---|---|---|
| *B01J 20/26* | (2006.01) | |
| *B01J 20/20* | (2006.01) | |
| *B01J 20/28* | (2006.01) | |
| *B01J 20/30* | (2006.01) | |
| *B01J 20/32* | (2006.01) | |
| *C08G 73/02* | (2006.01) | |

(52) U.S. Cl.
CPC ............. *B01J 20/262* (2013.01); *B01J 20/20* (2013.01); *B01J 20/28016* (2013.01); *B01J 20/3085* (2013.01); *B01J 20/324* (2013.01); *B01J 20/3212* (2013.01); *B01J 20/3293* (2013.01); *C08G 73/0206* (2013.01); *C08G 73/0213* (2013.01)

(58) Field of Classification Search
CPC . B01J 20/26; B01J 20/262; B01J 20/20; B01J 20/28016; C08G 73/0206

USPC ........................................................ 502/401
See application file for complete search history.

(56) References Cited

FOREIGN PATENT DOCUMENTS

| JP | 201100502750 A | 1/2011 |
|---|---|---|
| KR | 101262213 A | 6/2009 |
| KR | 101468292 A | 9/2014 |

OTHER PUBLICATIONS

T.C. Drage et al; Thermal stability of polyethylenimine based carbon dioxide adsorbents and its influence on selection of regeneration strategies; Microporous and Mesoporous Materials; May 16, 2008; pp. 504-512; 116; Elsevier; Netherland.
G. Qi et al; High efficiency nanocomposite sorbents for CO2 capture based on amine-functionalized mesoporous capsules; Energy & Environmental Science; 2011; pp. 444-452; 4; The Royal Society of Chemistry; UK.
X. Xu et al; Preparation and characterization of novel CO2 "molecular basket" adsorbents based on polymer-modified mesoporous molecular sieve MCM-41; Microporous and Mesoporous Materials; 2003; pp. 29-45; 62; Elsevier; Netherland.
M. B. Yue et al; Promoting the CO2 adsorption in the amine-containing SBA-15 by hydroxyl group; Microporous and Mesoporous Materials; 2008; pp. 74-81; 114; Elsevier; Netherland.
H. Zhang et al; CO2 capture on easily regenerable hybrid adsorbents based on polyamines and mesocellular silica foam. Effect of pore volume of the support and polyamine molecular weight; RSC Advances; 2014; 19403; 4; The Royal Society of Chemistry; UK.

*Primary Examiner* — Edward Johnson
(74) *Attorney, Agent, or Firm* — STIP Law Group, LLC (57) ABSTRACT

Carbon dioxide adsorbents are provided. The carbon dioxide adsorbents include a polymeric amine and a porous support on which the polymeric amine is supported. the polymeric amine consists of a polymer skeleton containing nitrogen atoms and branched chains bonded to the nitrogen atoms of the polymer skeleton. Each of the branched chains contains at least one nitrogen atom, the polymeric amine is modified by substitution of at least one of the nitrogen atoms of the polymer skeleton or the branched chains with a hydroxyl group-containing carbon chain.

15 Claims, 7 Drawing Sheets

POLYMERIC AMINE BASED CARBON DIOXIDE ADSORBENTS

CROSS-REFERENCE TO RELATED APPLICATIONS

This application claims the priority of the Korean Patent Applications NO 10-2016-0086889 filed on Jul. 8, 2016, in the Korean Intellectual Property Office, the disclosure of which is incorporated herein by reference.

BACKGROUND OF THE INVENTION

1. Field of the Invention

The present disclosure relates to polymeric amine based carbon dioxide adsorbents, and more specifically to polymeric amine based carbon dioxide adsorbents that are excellent in adsorption capacity, selectivity, and long-term stability.

2. Description of the Related Art

With the rapidly increasing use of fossil fuels, the atmospheric concentration of carbon dioxide as a typical greenhouse gas is also increasing rapidly. The increased carbon dioxide concentration has caused changes in climate worldwide, such as flooding, droughts, desertification, changes in the ecosystem, and depletion of the ozone layer that are emerging as global environmental problems. Under such circumstances, considerable research efforts have been made to develop technologies for the reduction and prevention of carbon dioxide emissions. According to the World Energy Outlook report published by the International Energy Agency (IEA) in 2007, it is anticipated that there will be a growing demand for fossil fuels. Despite the fact that the development of renewable energy capable of replacing fossil fuels can provide a direct solution to the problems of climate change, there is an urgent need to develop advanced carbon dioxide capture and storage (CCS) technologies for stable use of fossil fuels until economical and practical renewable energy is developed.

CCS is a technology that can capture, store, and sequester carbon dioxide produced during combustion or processing of fossil fuels for energy production without releasing into the atmosphere. CCS is known to be the most efficient and practical technology for reducing carbon dioxide emissions. Thus, much research and investment have focused on the development of CCS technologies in many advanced countries. Carbon dioxide capture technologies are broadly divided into oxy-combustion capture using oxygen rather than air for fuel combustion, pre-combustion capture for separating carbon dioxide by reaction with fuels before combustion of the fuels, and post-combustion capture for capturing carbon dioxide from gaseous mixtures produced after combustion of fossil fuels. Particularly, post-combustion capture is most readily available in chemical plants that are currently in operation. In addition, post-combustion capture is the most promising technology in terms of economic feasibility and efficiency for commercialization.

Post-combustion capture technologies include wet scrubbing, adsorption, membrane separation, and cryogenics, which are being actively investigated. Such technologies have been developed toward increasing the efficiency of carbon dioxide capture. The most widely used technology is a wet scrubbing method using monoethanolamine (MEA) in which carbon dioxide present in flue gases after combustion is allowed to react with MEA diluted to <30% so that it can be adsorbed to the MEA, and the carbon dioxide-adsorbed MEA is then heated to separate the carbon dioxide at high concentration simultaneously with the recovery of MEA. This method enables the recovery of about 90% of the amount of carbon dioxide released from power plants but it demands high energy for carbon dioxide capture. In industrial sites where greenhouse gas emissions should be reduced on a large scale, cost and scale-up problems are very critical issues that need to be addressed. Thus, the wet scrubbing method is considered economically inefficient. For this reason, gas separation methods based on the use of physical adsorbents or membranes requiring less energy for regeneration are emerging as new alternatives for carbon dioxide capture. Such methods theoretically require low energy consumption but fail to reproduce the adsorption performance of conventional amine scrubbing methods.

To overcome this disadvantage, studies based on the concept of "molecular basket" are actively underway in South Korea and other countries. According to the concept of "molecular basket", amine-based adsorbents having the ability to strongly adsorb carbon dioxide are supported on adsorbents. In this connection, there are several reports on adsorbents prepared by supporting polyethyleneimines with a high density of amine groups on mesoporous silica MCM-41 (Xu, X., Song, C., Andresen J. M., Miller, B. G., Scaroni, A. W., "Preparation and Characterization of Novel $CO_2$ Molecular Basket Adsorbents Based on Polymer-modified Mesoporous Molecular Sieve MCM-41", Micro. Meso. Mater., 62, 29-45 (2003)) and sorbents prepared using mesoporous silica in the form of hollow spherical granules as a support for polyethyleneimines (Qi, G., Wang, Y., Estevez, L., Duan, X., Anako, N., Park, A. A., Li, W., Jones, C. W., Giannelis, E. P., "High efficiency nanocomposite sorbents for $CO_2$ capture based on amine-functionalized mesoporous capsules", Energy & Environmental Science 4, 444-452 (2011)). In addition, adsorbents based on polyethyleneimines supported on mesocellular silica foam (MCF) with a large mesopore volume were reported together with their carbon dioxide adsorption capacities and adsorption rates (Zhang, H., Goeppert, A., Czaun, M., Surya-Prakash, G. K., Olah, G. A., "$CO_2$ capture on easily regenerable hybrid adsorbents based on polymeric amines and mesocellular silica foam. Effect of pore volume of the support and polymeric amine molecular weight", RSC advances 4, 19403-19417 (2014)). These studies on carbon dioxide capture have focused on the modification of supports to effectively support the largest possible amount of polyethyleneimines, achieving maximum carbon dioxide adsorption performance.

However, according to a report by Drage's group at the University of Nottingham (Drage, T. C., Arenillas, A., Smith, K. M., "Thermal stability of polyethyleneimine based carbon dioxide adsorbents and its influence on selection of regeneration strategies", Microporous and Mesoporous Materials 116, 504-512 (2008)), polyethyleneimines are known to undergo severe deactivation due to the formation of ureas upon adsorbent regeneration at an elevated temperature (>130° C.) and 100% $CO_2$, which are desorption conditions for temperature swing adsorption (TSA) processes. This deactivation is a major cause of low long-term stability in continuous adsorption-desorption processes.

In an effort to overcome this limitation, Zhu's group at Nanjing University confirmed that an adsorbent prepared by physically mixing tetraethylenepentamine (TEPA) with diethanolamine (DEA) containing hydroxyethyl groups and supporting the amine mixture on SBA-15 maintains its adsorption capacity during 6 temperature swing adsorption cycles (Zhu, J. H., Yue, M. B., Sun, L. B., "Promoting the $CO_2$ adsorption in the amine-containing SBA-15 by hydroxyl group", Microporous and Mesoporous Materials 114, 74-81 (2008)). In practice, however, DEA with a lower molecular weight is evaporated from the amine mixture as desorption cycles proceed continuously at high temperature, and as a result, the adsorption capacity of the adsorbent deteriorates with increasing number of cycles. Thus, such mixed amine systems are impossible to use in temperature swing adsorption (TSA) and have been investigated so far mainly for pressure swing adsorption (PSA) at low temperature.

Korean Patent No. 1468292 discloses a carbon dioxide adsorbent including a polyvalent amine-adsorbed porous metal-organic framework. The adsorbent is advantageous in that the polyvalent amine adsorbed to the metal-organic framework can adsorb low-concentration carbon dioxide but has the disadvantage of high production cost compared to general adsorbents. Another disadvantage of the adsorbent is that only a limited amount of the polyvalent amine is adsorbed to the metal-organic framework, making it difficult to dispose of a large amount of carbon dioxide.

Korean Patent No. 1262213 discloses a nano-structured supported regenerative polymeric amine and a polymeric amine-polyol sorbent for separating carbon dioxide from gaseous mixtures, including the air. The sorbent is prepared by adsorbing an amine to nano-sized (<100 nm) solid particles. However, the sorbent has the disadvantage of poor adsorption/desorption stability because ureas are formed at high temperature.

Such studies on carbon dioxide capture have focused on the modification of supports to effectively support the largest possible amount of polyethyleneimines, achieving maximum carbon dioxide adsorption capacity, but fail to propose solutions to the problems encountered when the adsorbents are applied to actual processes. In the case of an amine-based $CO_2$ adsorbent including an amine-based material supported on a support, the adsorbent particles tend to aggregate due to the presence of the viscous amine groups on the surface of the adsorbent or the use of the non-conductive support generates static electricity, which may cause many problems, such as plugging of fluid flow in reactors, that negatively affect safe operation.

Thus, there is a need to develop amine-based $CO_2$ adsorbents for carbon dioxide capture that are suitable for use in real processes and have superior adsorption capacity and long-term stability.

SUMMARY OF THE INVENTION

According to one aspect of the present invention, there is provided a carbon dioxide adsorbent including: a polymeric amine consisting of a polymer skeleton containing nitrogen atoms and branched chains bonded to the nitrogen atoms of the polymer skeleton, each branched chain containing at least one nitrogen atom; and a porous support on which the polymeric amine is supported, wherein the polymeric amine is modified by substitution of at least one of the nitrogen atoms of the polymer skeleton or the branched chains with a hydroxyl group-containing carbon chain.

According to a further aspect of the present invention, there is provided a polymeric amine for carbon dioxide adsorption consisting of a polymer skeleton containing nitrogen atoms and branched chains bonded to the nitrogen atoms of the polymer skeleton, each branched chain containing at least one nitrogen atom, wherein the polymeric amine is modified by substitution of at least one of the nitrogen atoms of the polymer skeleton or the branched chains with a hydroxyl group-containing carbon chain.

According to another aspect of the present invention, there is provided a method for preparing a carbon dioxide adsorbent, the method including (a) adding an oxide derivative to a solution of a raw polyalkyleneimine in a solvent, (b) stirring the solution such that at least one of the nitrogen atoms of the raw polyalkyleneimine is alkylated with a hydroxyethyl group, (c) removing the solvent from the reaction solution to obtain a polyalkyleneimine modified by partial substitution with the hydroxyethyl group, and (d) supporting the modified polyalkyleneimine on a porous support.

According to another aspect of the present invention, there is provided a core-shell structured carbon dioxide adsorbent in which the core includes a polymeric amine consisting of a polymer skeleton containing nitrogen atoms and branched chains bonded to the nitrogen atoms of the polymer skeleton, each branched chain containing at least one nitrogen atom, and a porous support on which the polymeric amine is supported, and the shell includes a conductive carbon material layer surrounding and coated on the core wherein the polymeric amine is modified by substitution of at least one of the nitrogen atoms of the polymer skeleton or the branched chains with a hydroxyl group-containing carbon chain.

According to another aspect of the present invention, there is provided a method for preparing a carbon dioxide adsorbent, the method including (a) adding an oxide derivative to a solution of a raw polyalkyleneimine in a solvent, (b) stirring the solution such that at least one of the nitrogen atoms of the raw polyalkyleneimine is alkylated with a hydroxyethyl group, (c) removing the solvent from the reaction solution to obtain a polyalkyleneimine modified by partial substitution with the hydroxyethyl group, (d) supporting the modified polyalkyleneimine on a porous support, (e) adding a conductive carbon material to the modified polyalkyleneimine-supported porous support, (f) stirring the mixture such that the conductive carbon material is uniformly coated on the surface of the modified polyalkyleneimine-supported porous support, to obtain a core-shell structured adsorbent, and (g) removing the conductive carbon material remaining uncoated on the surface of the modified polyalkyleneimine-supported porous support.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Exemplary embodiments of the present invention will now be described in detail. Unless otherwise defined, all technical and scientific terms used herein have the same meaning as commonly understood by one of ordinary skill in the art to which this invention belongs. Generally, the nomenclature used herein and in the following is well-known and commonly used in the art.

A carbon dioxide adsorbent according to one aspect of the present invention includes: a polymeric amine consisting of a polymer skeleton containing nitrogen atoms and branched chains bonded to the nitrogen atoms of the polymer skeleton, each branched chain containing at least one nitrogen atom; and a porous support on which the polymeric amine is supported. the polymeric amine is modified by substitution of at least one of the nitrogen atoms of the polymer skeleton or the branched chains with a hydroxyl group-containing carbon chain.

the polymeric amine is not limited and examples thereof include polyalkyleneimines, such as polyethyleneimines and polypropyleneimines, polyamidoamines, and polyvinylamines. the polymeric amine is preferably a polyalkyleneimine, more preferably a polyethyleneimine in terms of the content of nitrogen atoms in the molecular structure.

the polymeric amine may have a weight average molecular weight of 200 to 150,000. If the weight average molecular weight of the polymeric amine is less than the lower limit defined above, the polymeric amine may be lost by evaporation at high temperature. Meanwhile, if the weight average molecular weight of the polymeric amine exceeds the upper limit defined above, the polymeric amine may suffer from kinetic limitations during adsorption due to its high viscosity.

In one embodiment, the polymer skeleton of the polymeric amine is a main chain and has a repeating unit structure represented by $-[(CH_2)_x-NR]_y-$ (where R may be hydrogen or a branched chain). For example, the repeating unit structure wherein R is hydrogen is a secondary amine moiety.

The branched chain may have an alkyleneamine structure represented by $-(CH_2)_x-NH_2$ or an alkyleneimine structure represented by $-(CH_2)_x-NR'_2$. For example, when the branched chain is a primary amine group represented by $-(CH_2)_x-NH_2$, the repeating unit structure bonded with the branched chain is a tertiary amine moiety. Meanwhile, when the branched chain has a structure represented by $-(CH_2)_x-NR'_2$, one of the R's may be an alkyleneamine or alkyleneimine group and the other R' may be i) hydrogen, ii) an alkyleneamine group or iii) an alkyleneimine group. In the case of i), the repeating unit structure bonded with the branched chain is a tertiary amine moiety and the branched chain is a secondary amine group. In the case of ii), the repeating unit structure bonded with the branched chain is a tertiary amine moiety, the branched chain is a tertiary amine group, and the alkyleneamine group is a primary amine group. In the case of iii), the repeating unit structure bonded with the branched chain is a tertiary amine moiety, the branched chain is a tertiary amine group, and the alkyleneimine group is a secondary or tertiary amine group.

Specifically, the polymeric amine may basically have a polyethyleneimine (i.e. x=2) or polypropyleneimine (i.e. x=3) structure. The polyethyleneimine structure is preferred in terms of the content of nitrogen atoms in the molecular structure.

Polyethyleneimines may include polymers constructed from $-(CH_2CH_2NH)-$ as a monomer. Polyethyleneimines may include linear polyethyleneimines, branched polyethyleneimines, dendritic polyethyleneimines, and combinations thereof. Polyethyleneimines may generally include primary, secondary, and tertiary amine groups. Polyethyleneimines are terminated with primary amine groups ($-NH_2$). Secondary amine groups (e.g., $-CH_2CH_2NHCH_2CH_2$) are present over the entire chain of polyethyleneimines. Tertiary amine groups are present only at branch points of branched or dendritic polyethyleneimines.

According to one embodiment of the present invention, at least one of the N atoms in the branched chains of the polyalkyleneimine structure may be substituted with a hydroxyl group-containing carbon chain. This substitution means that one of the hydrogen atoms bonded to the N atoms of the primary or secondary amine groups present in the polyalkyleneimine structure is removed, and instead the carbon atom of a hydroxyl group-containing carbon chain is bonded to the corresponding N atom. By the N substitution, the corresponding amine group is converted to a secondary or tertiary amine group.

In the formula representing the repeating unit structure of the polymer skeleton, x is from 2 to 6 and y representing the average number of repeating units in the polyalkyleneimine chain is from 5 to 100.

The hydroxyl group-containing carbon chain may have 1 to 20 carbon atoms and may contain 1 to 10 hydroxyl groups. The hydroxyl group-containing carbon chain may include one or more double bonds therein and may also be substituted with one or more substituents. The substituents may be $C_1$-$C_{18}$ alkyl, $C_3$-$C_{10}$ cycloalkyl, $C_1$-$C_{18}$ alkoxy, nitro, halo, and amine groups.

In one embodiment, the hydroxyl group-containing carbon chain may have a structure represented by $-(CH_2)_m(OH)_nL$ (where m is an integer from 1 to 20, preferably from 2 to 10, more preferably 2, and n is an integer from 1 to 10, preferably from 1 to 5, more preferably 1). Depending on the length of the alkylene group and the number of OH groups, the basicity or steric hindrance of the polymeric amine may be controlled upon $CO_2$ adsorption/desorption.

In the formula representing the structure of the hydroxyl group-containing carbon chain, L may be hydrogen, $C_1$-$C_{18}$ alkyl, $C_3$-$C_{10}$ cycloalkyl, $C_1$-$C_{18}$ alkoxy, $-CH=CH_2$, $-CH=CHCH_2CH_3$, $-CH_2CH=CHCH_3$, $-CH_2CH_2CH=CH_2$, $-CH=CHCH_2CH_2CH_3$, $-CH_2CH=CHCH_2CH_2CH_3$, $-CH_2CH_2CH=CHCH_2CH_3$, $-CH_2CH_2CH_2CH=CHCH_3$, $-CH_2CH_2CH_2CH_2CH=CH_2$, —CH=CHCH$_2$CH$_2$CH$_2$CH$_2$CH$_3$,
—CH$_2$CH=CHCH$_2$CH$_2$CH$_2$CH$_3$,
—CH$_2$CH$_2$CH=CHCH$_2$CH$_2$CH$_3$,
—CH$_2$CH$_2$CH$_2$CH=CHCH$_2$CH$_3$,
—CH$_2$CH$_2$CH$_2$CH$_2$CH=CHCH$_3$,
—CH$_2$CH$_2$CH$_2$CH$_2$CH$_2$CH=CHCH$_3$,
—CH$_2$CH$_2$CH$_2$CH$_2$CH$_2$CH$_2$CH=CH$_2$, —CH$_2$O(CH$_2$)$_3$Si(OCH$_3$)$_3$, —CH$_2$O(CH$_2$)$_3$Si(OCH$_2$CH$_3$)$_3$, —CH$_2$O(CH$_2$)$_2$CH$_3$, —CH$_2$O(CH$_2$)$_3$CH$_3$, —CH$_2$OCH=CHCH$_3$ or —CH$_2$OCH$_2$CH=CH$_2$. L is preferably C$_1$-C$_{18}$ alkyl. More specific examples of preferred C$_1$-C$_{18}$ alkyl groups include methyl, ethyl, propyl, butyl, pentyl, hexyl, and octyl.

As used herein, the term "C$_1$-C$_{18}$ alkyl" refers to a C$_1$-C$_{18}$ straight chained or branched monovalent alkyl radical which may be unsubstituted or substituted with one or more other groups. This term is further exemplified by radicals such as methyl, ethyl, n-propyl, isopropyl, n-butyl, s-butyl, and t-butyl.

As used herein, the term "C$_1$-C$_{18}$ alkoxy" refers to a radical represented by R'—O— (where R' is C$_1$-C$_{18}$ alkyl) which may be unsubstituted or substituted with one or more other groups.

The term "C$_3$-C$_{10}$ cycloalkyl" refers to a saturated monovalent monocyclic hydrocarbon radical (e.g., cyclopropyl, cyclobutyl or cyclohexyl) consisting of 3 to 10 carbon atoms, which may be unsubstituted or substituted with one or more other groups.

According to one embodiment of the present invention, the polymeric amine may be modified by partial substitution of the polyalkyleneimine structure with the hydroxyl group-containing carbon chain. For example, the polymeric amine may be modified by alkylating the polyalkyleneimine structure. The alkylation is achieved through a nucleophilic substitution reaction between the OH-containing hydrocarbon chain and the nitrogen of the alkyleneamine or alkyleneimine. A leaving group is introduced into the OH-containing hydrocarbon chain.

In one embodiment, the hydroxyl group-containing carbon chain may be introduced by reaction of the polyalkyleneimine structure with an oxide derivative. The reaction can proceed easily by ring-opening of the oxide derivative. In this case, in the formula representing the structure of the hydroxyl group-containing carbon chain, m and n may be 2 and 1, respectively. That is, the hydroxyl group-containing carbon chain may be a hydroxyethyl group. One example of the resulting structure may be represented by Formula 1:

(1)

According to one embodiment of the present invention, the introduction of the oxide derivative allows the polyalkyleneimine to have a structure modified by partial substitution with the hydroxyl group-containing carbon chains, as represented by Formula 1. The polyalkyleneimine modified by partial substitution with the hydroxyethyl groups may have the function of reversibly adsorbing carbon dioxide from the ambient air.

The polyalkyleneimine modified by partial substitution with the hydroxyl group-containing carbon chain may be prepared by the following method. First, an oxide derivative is added to a solution of a raw polyalkyleneimine in a solvent (step (a)). Then, the solution is stirred such that at least one of the nitrogen atoms of the raw polyalkyleneimine is alkylated with a hydroxyethyl group (step (b)). Subsequently, the solvent is removed from the reaction solution to obtain a polyalkyleneimine modified by partial substitution with the hydroxyethyl group (step (c)). Finally, the modified polyalkyleneimine is supported on a porous support (step (d)).

For example, the polyalkyleneimine may be the polyethyleneimine represented by Formula 2:

(2)

In one embodiment of the present invention, the alkylation may be achieved by the ring-opening reaction of the oxide derivative, as depicted in Reaction Scheme 3:

-continued

The oxide derivative is preferably a monoepoxide that can participate in the alkylation without causing crosslinking. In Reaction Scheme 3, each X is a substituent derived from the epoxide and may be represented by —C$_2$H$_4$(OH)L (where L is as defined above).

The presence of the modified polymeric amine improves the CO$_2$ desorption capacity of the carbon dioxide adsorbent. The reason for the improved CO$_2$ desorption capacity of the carbon dioxide adsorbent by modification can be explained as follows. The modification of the polyethyleneimine with the oxide derivative leads to removal of the primary amine groups and alkylation of the polyethyleneimine. The resulting hydroxyethyl groups are well-known electron withdrawing groups and can reduce the basicity of the central nitrogen atoms, weakening the ability of the polymeric amine to bind to CO$_2$. The ethyl side chains increase the steric hindrance of the central nitrogen atoms to destabilize carbamates formed after CO$_2$ adsorption.

That is, the ethyl side chains decrease the basicity of the amine and cause steric hindrance to reduce the amount of energy consumed for CO$_2$ desorption and facilitate the regeneration of the carbon dioxide adsorbent.

According to one embodiment, the oxide derivative may be used in a mole ratio of 0.2-0.95:1 relative to the nitrogen atoms present in the raw polyalkyleneimine. If the mole ratio is <0.2:1, high-temperature stability of the carbon dioxide adsorbent may not be expected. Meanwhile, if the mole ratio >0.95:1, the nitrogen atoms present in the polyalkyleneimine form an excessively large number of tertiary amine groups, resulting in a reduction in the amount of carbon dioxide adsorbed. Therefore, the mole ratio of the nitrogen atoms present in the raw polyalkyleneimine to the oxide derivative is 1:0.2-0.95, preferably 1:0.20-0.90, more preferably 1:0.30-0.80.

According to one embodiment, 10-90% of all nitrogen atoms of the polyalkyleneimine modified by partial substitution may be present in the form of modified primary or secondary amine groups. Preferably, 20-70% of all nitrogen atoms of the modified polyalkyleneimine are present in the form of modified primary or secondary amine groups. If the number of the substituted nitrogen atoms is outside the range defined above, the high-temperature stability of the carbon dioxide adsorbent may deteriorate.

According to one embodiment, the raw polyalkyleneimine may be linear or branched. Any suitable linear or branched polyalkyleneimine may be used without limitation as the raw polyalkyleneimine. The number average molecular weight of the raw polyalkyleneimine is preferably from 300 to 150,000.

The solvent is may be selected from the group consisting of water, methanol, ethanol, methyl chloride, carbon tetrachloride, tetrahydrofuran, and mixtures thereof. Any suitable solvent capable of dissolving the polyalkyleneimine may be used without limitation. The solvent is preferably methanol.

The oxide derivative may have any suitable structure. The selectivity of the oxide derivative to the primary or secondary amine groups present in the polyalkyleneimine may vary depending on the structure of the oxide derivative. In one embodiment, the oxide derivative may be, for example, an aliphatic 1,2-epoxide, an internal aliphatic epoxide, an alicyclic epoxide, an aromatic epoxide or an aliphatic alkylene oxide. For example, the oxide derivative may have 2 to 12 carbon atoms.

Non-limiting examples of suitable oxide derivatives include ethylene oxide, propylene oxide, butylene oxide, 1-pentene oxide, 1-hexene oxide, 1-octene oxide, 1-decene oxide, 1-dodecene oxide, 1-tetradecene oxide, 1-hexadecene oxide, 1-octadecene oxide, glycidol, (3-glycidyloxypropyl)trimethoxysilane, (3-glycidyloxypropyl)triethoxysilane, 1,3-bis(3-glycidyloxypropyl)tetramethyldisiloxane, butadiene monoxide, 1,2-epoxy-7-octene, isopropyl glycidyl ether, butyl glycidyl ether, t-butyl glycidyl ether, 2-ethylhexyl glycidyl ether, allyl glycidyl ether, cyclopentene oxide, cyclohexene oxide, cyclooctene oxide, cyclododecene oxide, 2,3-epoxynorbornane, limonene oxide, 2,3-epoxypropylbenzene, styrene oxide, phenyl propylene oxide, 1,2-epoxy-3-phenoxypropane, benzyloxymethyl oxirane, glycidyl methylphenyl ether, epoxypropyl methoxyphenyl ether, biphenyl glycidyl ether, and naphthyl glycidyl ether. These oxide derivatives may be used alone or as a mixture thereof. Preferably, the oxide derivative is an alkylene oxide, specifically butylene oxide.

For complete removal of the solvent, the method may further include heating the polyalkyleneimine modified by partial substitution to a temperature of 283 to 473 K in a vacuum oven. Although the solvent is removed from the solution after completion of the reaction, a very small amount of the solvent may remain unremoved in the polyalkyleneimine modified by partial substitution. The removal of the solvent by heating the polyalkyleneimine modified by partial substitution to a temperature of 283 to 473 K enhances the carbon dioxide adsorption capacity of the carbon dioxide adsorbent. The heating temperature is more preferably from 303 to 353 K.

Since the polyethyleneimine modified by partial substitution is thermally stable at high temperature, its original ability to adsorb carbon dioxide is substantially maintained even after several adsorption/desorption cycles.

The modified polyalkyleneimine is supported on a porous support by grafting it with functional groups (e.g., hydroxyl groups) of the porous support or impregnating it into the pores of the porous support. The porous support may be selected from the group consisting of silica, mesoporous silica, hetero element-doped silica, hetero element-doped mesoporous silica, alumina, hetero element-doped alumina, activated carbon, carbon-based supports, hetero element-doped activated carbon, hetero element-doped carbon-based supports, zeolite, and hetero element-doped zeolite. Preferably, the porous support is silica.

An additive may be added to the porous support to further enhance the thermal stability of the adsorbent and impart chemical and mechanical stability to the adsorbent. The additive may be added in an amount ranging from 1 to 50 parts by weight, based on 100 parts by weight of the porous support. This range ensures appropriate physical properties of the adsorbent. Specific examples of preferred additives include carbon black, cetrimonium bromide (CTAB), dodecyltrimethylammonium bromide (DTAB), sodium triacetoxyborohydride (STAB), sodium dodecylbenzenesulfonate (SDBS), sodium dodecyl sulfate (SDS), phosphatidylcholine (PC), poly(ethylene glycol)-block-poly(propylene glycol)-block-poly(ethylene glycol) (P123), sorbitan monooleate (Span80), and 4-(1,1,3,3-tetramethylbutyl)phenyl-polyethylene glycol (Triton X-100). These additives may be used alone or as a mixture thereof. The additive is more preferably carbon black or boric acid, most preferably boric acid.

In one embodiment, the method may further include heating the polyalkyleneimine modified by partial substitution that is supported on the porous support in a vacuum oven. Although the solvent is removed from the solution after completion of the reaction, a very small amount of the solvent may remain unremoved in the adsorbent. The removal of the solvent by heating the polyalkyleneimine modified by partial substitution that is supported on the porous support to a temperature of 283 to 473 K enhances the carbon dioxide adsorption capacity of the adsorbent. The heating temperature is more preferably from 303 to 353 K.

According to one embodiment of the present invention, the carbon dioxide adsorbent has high carbon dioxide selectivity and is not decomposed even when thermally processed several times due to the superior high-temperature stability of the modified polyalkyleneimine. As a result, the carbon dioxide adsorbent maintains its ability to adsorb carbon dioxide even after several adsorption/desorption cycles, which was found in a carbon dioxide adsorption/desorption experiment using the adsorbent.

When the modified polyalkylene-based carbon dioxide adsorbent is applied to an actual carbon dioxide capture, the sticky organic material present on the adsorbent surface may cause aggregation of the adsorbent particles. Charges are accumulated in the support during carbon dioxide capture, and as a result, static electricity may be generated when the particles collide with each other, causing plugging of fluid flow in reactors.

According to a further aspect of the present invention, a core-shell structured carbon dioxide adsorbent is provided in which the core includes a modified polyalkyleneimine-supported porous support and the shell contains a conductive carbon layer. The modified polyalkyleneimine-supported porous support is the same as that described above. That is, the core includes a polymeric amine consisting of a polymer skeleton containing nitrogen atoms and branched chains bonded to the nitrogen atoms of the polymer skeleton, each branched chain containing at least one nitrogen atom, and a porous support on which the polymeric amine is supported wherein the polymeric amine is modified by substitution of at least one of the nitrogen atoms of the polymer skeleton or the branched chains with a hydroxyl group-containing carbon chain. The shell includes a conductive carbon material layer surrounding and coated on the core.

Figure 1:
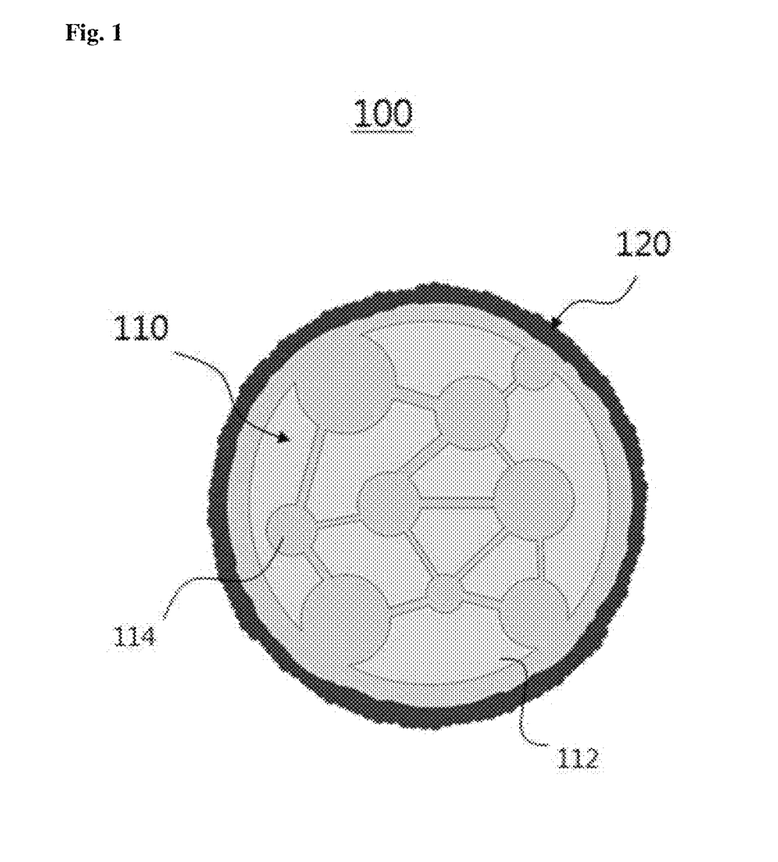
FIG. 1 is a cross-sectional view of a core-shell structured carbon dioxide adsorbent according to one embodiment of the present invention.

FIG. 1 is a cross-sectional view of a core-shell structured carbon dioxide adsorbent according to one embodiment of the present invention. Referring to FIG. 1, the carbon dioxide adsorbent 100 includes a core 110 and a shell 120. The core 110 has a structure in which a polymeric amine 114 is supported on a porous support 112 and the shell 120 surrounds the core 110 and contains a conductive carbon material layer. The use of a conductive material for the shell 120 prevents aggregation of the particles caused by static electricity generated when the particles collide with each other. Thus, it is preferred that the conductive material for the shell 120 has low resistivity. The conductive carbon material is substantially suitable for scale-up due to its low price. The resistivity of the conductive carbon material is from $10^{-6}$ to $10^3$ Ω·cm.

Non-limiting examples of suitable conductive carbon materials for the shell 120 include carbon black, graphite, activated carbon, carbon nanotubes, graphene, and carbon filaments.

The core-shell structured carbon dioxide adsorbent may be prepared by the following method. First, a powder of a conductive carbon material for the shell is added to the modified polymeric amine-supported porous support through steps (a) to (d) as a material for the core. Next, the mixture is stirred such that the powder of the conductive carbon material is uniformly coated on the modified polymeric amine-supported porous support. Subsequently, the conductive carbon material remaining uncoated on the surface of the modified polymeric amine-supported porous support is removed to obtain the desired core-shell structured carbon dioxide adsorbent. The core-shell structured carbon dioxide adsorbent obtained in such a simple way can maintain its core-shell structure even after repeated cycles of carbon dioxide adsorption/desorption because the viscous polymeric amine present on the surface of the porous support can physically interact with the conductive material.

Figure 2:
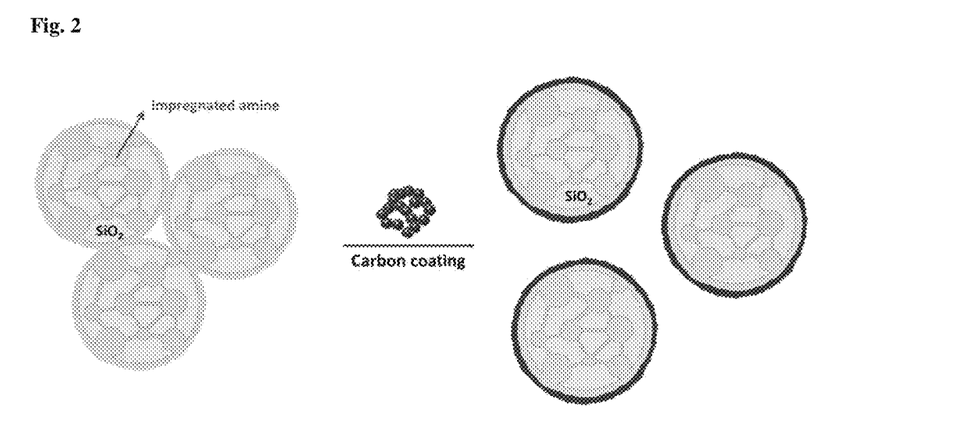
FIG. 2 shows an exemplary procedure for coating a conductive carbon material on the surfaces of core particles of a carbon dioxide adsorbent.

FIG. 2 shows an exemplary procedure for coating the conductive carbon material on the surfaces of the core particles of the carbon dioxide adsorbent. Referring to FIG. 2, the core particles composed of the amine impregnated into the pores of the $SiO_2$ support are coated with carbon to form shells. This carbon coating can prevent the particles from aggregating.

In one embodiment, the shell 120 may be coated by a dry process based on mechanical stirring. For example, the material for the core 110 is stirred by rotary tumbling or shaking in a container containing the powder of the conductive carbon material so that the conductive carbon material can be continuously attached to the surface of the core 110 to form the shell 120.

The amount of the conductive carbon material added to coat the core 110 may be from 0.1 to 20 parts by weight, preferably from 1 to 10 parts by weight, based on 100 parts by weight of the modified polymeric amine-supported porous support for the core 110. If the amount of the conductive carbon material is less than the lower limit defined above, the core is not sufficiently coated with the carbon material. Meanwhile, if the amount of the conductive carbon material exceeds the upper limit defined above, the carbon material may be lost during repeated cycles of carbon dioxide adsorption/desorption.

The core-shell structure of the carbon dioxide adsorbent including the polymeric amine-supported porous support coated with the conductive carbon material can effectively prevent aggregation of the adsorbent particles caused by the organic material present on the core surface and the generation of static electricity while maintaining the ability of the modified polyethyleneimine to adsorb carbon dioxide. In addition, the coating can also inhibit the supported material from leaching from the carbon dioxide adsorbent particles. Furthermore, the core-shell particles are prepared in an environmentally friendly and economically efficient way.

According to the exemplary embodiments of the present invention, the carbon dioxide adsorbents including the polymeric amine modified by substitution with the hydroxyl group-containing carbon chain are superior in high-temperature stability and, particularly, have high adsorption capacity, selectivity, and long-term stability. Due to these advantages, the use of the carbon dioxide adsorbents is suitable for the separation of carbon dioxide. In addition, the coating with the conductive carbon material increases the durability of the adsorbent particles and suppresses aggregation of the particles in a reactor, contributing to an improvement in processing efficiency.

The present invention will be explained in more detail with reference to the following examples. It will be obvious to those skilled in the art that these examples are merely for illustrative purposes and the scope of the invention is not to be construed as being limited thereto.

EXAMPLES

Figure 3:
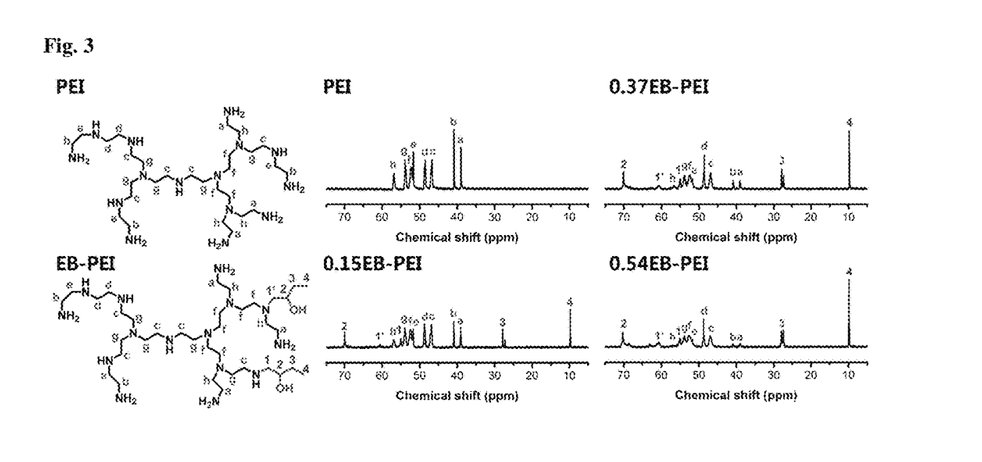
FIG. 3 shows nitrogen nuclear magnetic resonance ($^{13}$C-NMR) spectra of a pristine polyethyleneimine and functionalized-polyethyleneimines (0.15EB-PEI, 0.37EB-PEI, and 0.54EB-PEI) prepared in Example 1, the peaks of the spectra indicating the positions of amine groups present in the pristine polyethyleneimine and the modified polyethyleneimines.
Figure 4:
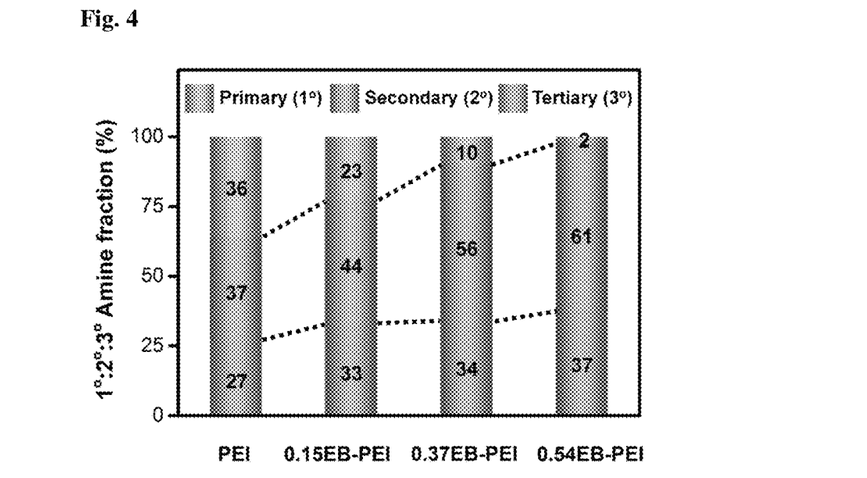
FIG. 4 shows the fractions of primary, secondary, and tertiary amine groups present in the pristine polyethyleneimine (PEI) and functionalized-polyethyleneimines (EB-PEIs), which were calculated from the areas under the peaks in FIG. 3.

Example 1: Synthesis of Polyethyleneimines Modified by Partial Substitution with Butylene Oxide In this example, polyethyleneimines modified by partial substitution with butylene oxide were synthesized. First, 2 g of a polyethyleneimine (Mn=1200, 19 mmol N/g) was dissolved in 10 g of methanol at 298 K. The solution was stirred at a constant rate of 400 rpm for 10 min. To the stirred polyethyleneimine/methanol solution was added butylene oxide in different amounts such that the mole ratios of the butylene oxide to the nitrogen (N) atoms present in the polyethyleneimine were 0.15:1, 0.37:1, and 0.54:1. Each of the mixtures was stirred at 400 rpm for additional 12 h to obtain a methanolic solution of a polyethyleneimine modified by partial substitution. Thereafter, the solution was heated in a vacuum oven at 50° C. for 12 h to remove the solvent. The resulting polyethyleneimines modified by partial substitution with different amounts of butylene oxide (mole ratios 0.15:1, 0.37:1, and 0.54:1) were referred to "0.15EB-PEI", "0.37EB-PEI", and "0.54EB-PEI", respectively. The polyethyleneimines modified by partial substitution and the pristine polyethyleneimine were analyzed for chemical shifts representing the positions of primary amine, secondary amine, and third amine groups present in the molecules by $^{13}C$-NMR spectroscopy. The results are shown in FIG. 3. The integrated areas under the peaks reveal the fractions of the primary, secondary, and tertiary amine groups present in the pristine polyethyleneimine (PEI) and functionalized-polyethyleneimines (EB-PEI). The results are shown in FIG. 4.

Example 2: Production $CO_2$ Adsorbents Including the Modified Polyethyleneimine-Supported Silica Polyethyleneimines modified by partial substitution with butylene oxide were prepared in the same manner as in Example 1. Adsorbents including the modified polyethyleneimines were prepared by the wet impregnation method. In each adsorbent, the corresponding modified polyethyleneimine was supported in an amount of 50 wt % with respect to the total weight of the adsorbent. Specifically, fumed silica was added in different amounts of 2.48 g, 3.20 g, and 3.92 g to the methanolic solutions of the polyethyleneimines modified by partial substitution with butylene oxide. Each of the mixtures was sufficiently stirred for 2 h such that the solution of the polyethyleneimine modified by partial substitution was sufficiently loaded into the pores of the fumed silica. The mixture was heated in a vacuum oven at 50° C. for 12 h to remove the solvent. The resulting adsorbents including the polyethyleneimines modified by partial substitution that were supported on the silica (2.48 g, 3.20 g, and 3.92 g) were referred to as "0.15EB-PEI/$SiO_2$", "0.37EB-PEI/$SiO_2$", and "0.54EB-PEI/$SiO_2$", respectively.

Comparative Example 1: Preparation of $CO_2$ Adsorbent Including Unmodified Pristine Polyethyleneimine Supported on Silica For direct comparison, an unmodified pristine polyethyleneimine was supported on silica by the wet impregnation method to prepare an adsorbent. Specifically, 2 g of a polyethyleneimine (Mn=1200, 19 mmol N/g) was dissolved in 10 g of methanol. The solution was stirred at a constant rate of 400 rpm for 10 min. Thereafter, 2 g of fumed silica was added to the polyethyleneimine/methanol solution and sufficiently stirred for 2 h such that the polyethyleneimine solution was sufficiently loaded into the pores of the fumed silica. The mixture was heated in a vacuum oven at 50° C. for 12 h to remove the solvent. The resulting adsorbent including the polyethyleneimine supported on the silica was referred to as "PEI/$SiO_2$".

Experimental Example 1: Temperature Swing Adsorption (TSA) Experiment

The long-term stabilities of the adsorbent including the polyethyleneimine supported on silica (PEI/$SiO_2$), which was prepared in Comparative Example 1, and the adsorbents including the polyethyleneimines modified by partial substitution with butylene oxide that were supported on silica (0.15EB-PEI/$SiO_2$, 0.37EB-PEI/$SiO_2$, and 0.54EB-PEI/

Figure 5:
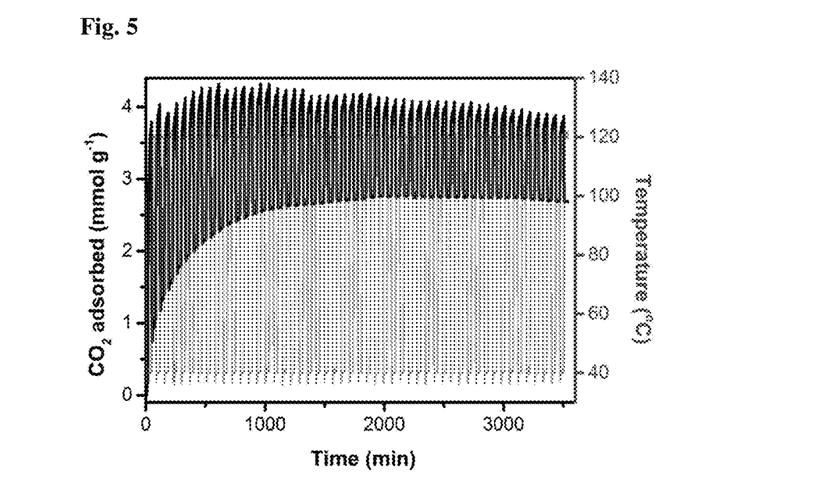
FIG. 5 shows time-dependent changes in the weight of an adsorbent of Example 2 in which 50 wt % of an unmodified polyethyleneimine was supported on fumed silica (PEI/SiO$_2$), during 50 consecutive TSA cycles (adsorption: 15% CO$_2$, 3% H$_2$O, 2% Ar in N$_2$ balance at 40° C.; adsorbent regeneration: 100% CO$_2$ at 120° C.) determined by thermogravimetric analysis (TGA)
Figure 6:
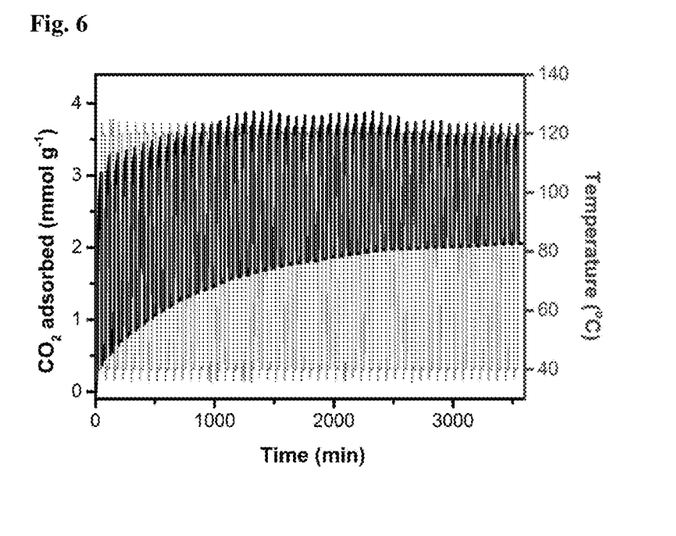
FIG. 6 shows time-dependent changes in the weight of an adsorbent of Example 2 in which a polyethyleneimine modified by partial substitution with butylene oxide was supported on fumed silica (0.15EB-PEI/SiO$_2$), during 50 consecutive TSA cycles (adsorption: 15% CO$_2$, 3% H$_2$O, 2% Ar in N$_2$ balance at 40° C.; adsorbent regeneration: 100% CO$_2$ at 120° C.) determined by thermogravimetric analysis (TGA)
Figure 7:
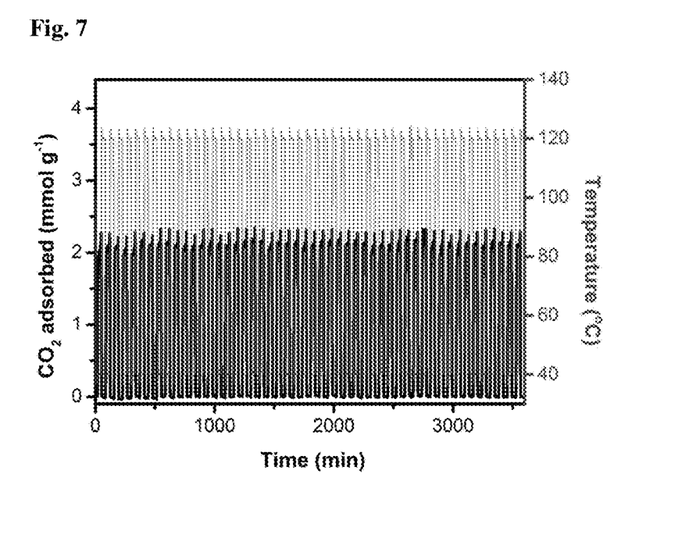
FIG. 7 shows time-dependent changes in the weight of an adsorbent of Example 2 in which a polyethyleneimine modified by partial substitution with butylene oxide was supported on fumed silica (0.37EB-PEI/SiO$_2$), during 50 consecutive TSA cycles (adsorption: 15% CO$_2$, 3% H$_2$O, 2% Ar in N$_2$ balance at 40° C.; adsorbent regeneration: 100% CO$_2$ at 120° C.) determined by thermogravimetric analysis (TGA)
Figure 8:
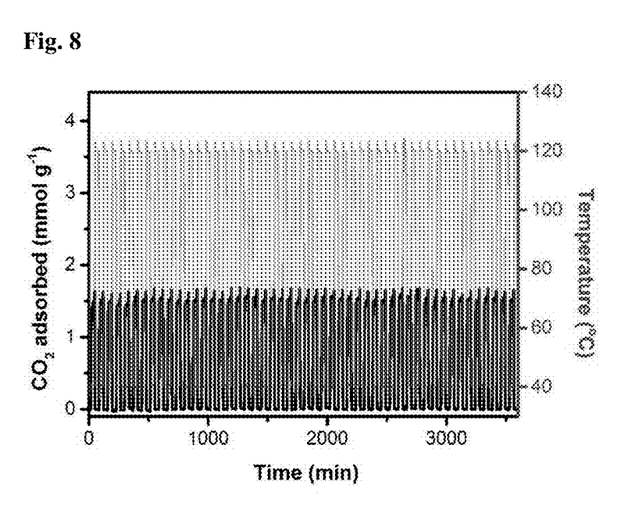
FIG. 8 shows time-dependent changes in the weight of an adsorbent of Example 2 in which a polyethyleneimine modified by partial substitution with butylene oxide was supported on fumed silica (0.54EB-PEI/SiO$_2$), during 50 consecutive TSA cycles (adsorption: 15% CO$_2$, 3% H$_2$O, 2% Ar in N$_2$ balance at 40° C.; adsorbent regeneration: 100% CO$_2$ at 120° C.) determined by thermogravimetric analysis (TGA)

$SiO_2$), which were prepared in Example 2, were investigated by thermogravimetric analysis (TGA). First, gases adsorbed to the adsorbent surfaces were desorbed using 100% $N_2$ at 100° C. for 1 h. Thereafter, carbon dioxide was adsorbed in a gaseous mixture of 15% $CO_2$, 3% $H_2O$, 2% Ar in $N_2$ balance at 40° C. for 30 min, which are conditions similar to those of actual processes, and the adsorbed carbon dioxide was desorbed (adsorbent renerated) at 100% $CO_2$ at 120° C. for 30 min. The adsorbent including the polyethyleneimine supported on silica ($PEI/SiO_2$) was subjected to 50 consecutive temperature swing adsorption (TSA) cycles. As the number of cycles increased, the adsorption capacity of the adsorbent decreased considerably, which was confirmed by thermogravimetric analysis. The results are shown in FIG. 5. The same applied to the adsorbents including the polyethyleneimines modified by partial substitution with butylene oxide that were supported on silica (0.15EB-PEI/$SiO_2$, 0.37EB-PEI/$SiO_2$, and 0.54EB-PEI/$SiO_2$). The adsorbents 0.15EB-PEI/$SiO_2$, 0.37EB-PEI/$SiO_2$, and 0.54EB-PEI/$SiO_2$ were subjected to 50 consecutive temperature swing adsorption (TSA) cycles and their adsorption capacities were determined by thermogravimetric analysis (TGA). The results are shown in FIGS. 6, 7, and 8. The adsorbent 0.15EB-PEI/$SiO_2$ having a low butylene oxide proportion had a high adsorption capacity but showed poor long-term stability. The adsorbent 0.54EB-PEI/$SiO_2$ having a high butylene oxide proportion showed very good long-term stability but had a low adsorption capacity. In contrast, the adsorbent 0.37EB-PEI/$SiO_2$ had a high adsorption capacity and showed good long-term stability with increasing number of cycles, as shown in FIG. 7. When the butylene oxide proportion was low, a sufficient number of amine groups were not modified with ethylhydroxyl groups, and as a result, the formation of ureas was incompletely suppressed, which explains poor long-term stability of the adsorbent. When the butylene oxide proportion was high, the number of substituted tertiary amine groups increased, resulting in low adsorption capacity of the adsorbent. From these results, it can be concluded that the addition of an appropriate amount of butylene oxide enables the development of an adsorbent with high adsorption capacity and good long-term stability. In this example, the adsorbent 0.37EB-PEI/$SiO_2$ was found to have highest performance.

Figure 9:
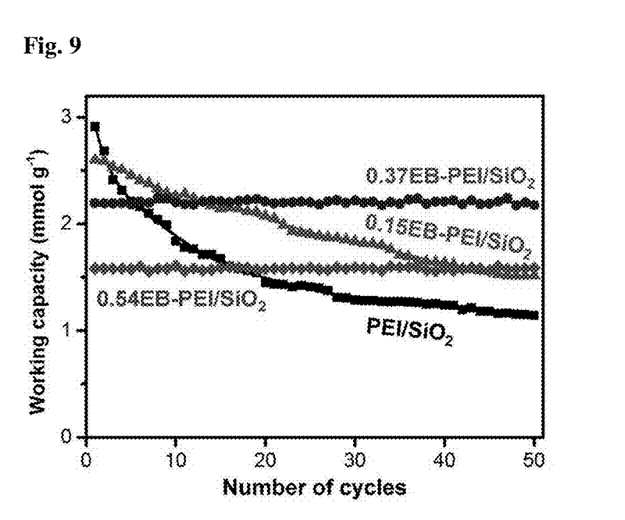
FIG. 9 shows CO$_2$ working capacities of adsorbents (PEI/SiO$_2$, 0.15EB-PEI/SiO$_2$, 0.37EB-PEI/SiO$_2$, and 0.54EB-PEI/SiO$_2$), which were prepared in Example 2, plotted over the number of TSA cycles.
Figure 10:
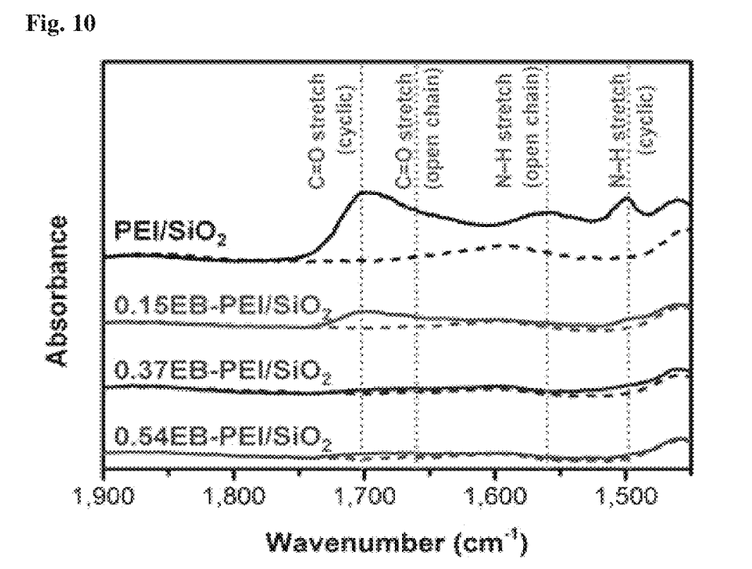
FIG. 10 shows FT-IR spectra of the adsorbents measured after 50 consecutive TSA cycles (adsorption: 15% CO$_2$, 3% H$_2$O, 2% Ar in N$_2$ balance at 40° C.; adsorbent regeneration: 100% CO$_2$ at 120° C.). Dashed lines indicate the spectra for freshly prepared samples, while solid lines indicate those for the samples after 50 consecutive TSA cycles.

The $CO_2$ working capacities of the adsorbent including the polyethyleneimine-supported silica ($PEI/SiO_2$) and the adsorbents including the polyethyleneimines modified by partial substitution that were supported on silica (0.15EB-PEI/$SiO_2$, 0.37EB-PEI/$SiO_2$, and 0.54EB-PEI/$SiO_2$), plotted over the number of TSA cycles were analyzed and the results are shown in FIG. 9. As can be seen from FIG. 9, 0.37EB-PEI/$SiO_2$ including the polyethyleneimine modified by partial substitution that was supported on silica was found to be the most optimum adsorbent because its very high adsorption capacity was maintained with increasing number of cycles. The reason why the adsorption capacity of the adsorbent 0.37EB-PEI/$SiO_2$ was maintained constant is because ureas were not formed when the adsorbent was regenerated under the desorption conditions (high temperature (>120° C.), 100% $CO_2$) for temperature swing adsorption (TSA). These results were actually confirmed by FT-IR spectroscopy of the adsorbent including the polyethyleneimine supported on silica ($PEI/SiO_2$) and the adsorbents including the polyethyleneimines modified by partial substitution that were supported on silica (0.15EB-PEI/$SiO_2$, 0.37EB-PEI/$SiO_2$, and 0.54EB-PEI/$SiO_2$). The adsorbance values of the adsorbents were analyzed before and after 50 consecutive TSA cycles (adsorption: 15% CO2, 3% H2O, 2% Ar in N2 balance at 40° C.; adsorbent regeneration: 100% CO2 at 120° C.). Dashed lines indicate the spectra for freshly prepared samples, while solid lines indicate those for the samples after 50 consecutive TSA cycles. The results are shown in FIG. 10. The peaks observed at around 1702 $cm^{-1}$ and 1494 $cm^{-1}$ indicate the presence of cyclic ureas formed by bonding between carbon dioxide and two amine groups in the polyethyleneimines. The peaks observed at around 1660 $cm^{-1}$ and 1555 $cm^{-1}$ indicate the presence of open-chain ureas formed between carbon dioxide and the amine groups in the adjacent polyethyleneimine molecules. As can be seen from FIG. 10, cyclic ureas and open-chain ureas were distinctly formed in the adsorbent including the polyethyleneimine-supported silica ($PEI/SiO_2$) but ureas were not formed in the adsorbents including the polyethyleneimines modified by partial substitution that were supported on silica (0.37EB-PEI/$SiO_2$ and 0.54EB-PEI/$SiO_2$).

Example 3: $CO_2$ Adsorbent Including Polyethyleneimine Modified by Partial Substitution that was Supported on Borosilicate A borosilicate was synthesized in which silicon (Si) and boron (B) were present in a mole ratio of 5:1. Specifically, 10 g of fumed silica and 2.06 g of boric acid ($H_3BO_3$) were dissolved in 100 g of water. The solution was stirred at a constant rate of 400 rpm for 3 h. Thereafter, the solvent was removed from the stirred solution, followed by calcination in air at 600° C. for 6 h to synthesize the desired borosilicate. A methanolic solution of a polyethyleneimine modified by partial substitution was prepared in the same manner as in Example 1.

The polyethyleneimine modified by partial substitution with butylene oxide was supported on the borosilicate by the wet impregnation method. Specifically, 2.96 g of the borosilicate was added to the methanolic solution of the polyethyleneimine modified by partial substitution with butylene oxide. The mixture was sufficiently stirred for 2 h such that the solution of the polyethyleneimine modified by partial substitution was sufficiently loaded into the pores of the borosilicate. The mixture was heated in a vacuum oven at 50° C. for 12 h to remove the solvent. The resulting adsorbent including the polyethyleneimine modified by partial substitution that was supported on the borosilicate was referred to as "0.35EB-PEI/Borosilicate".

Figure 11:
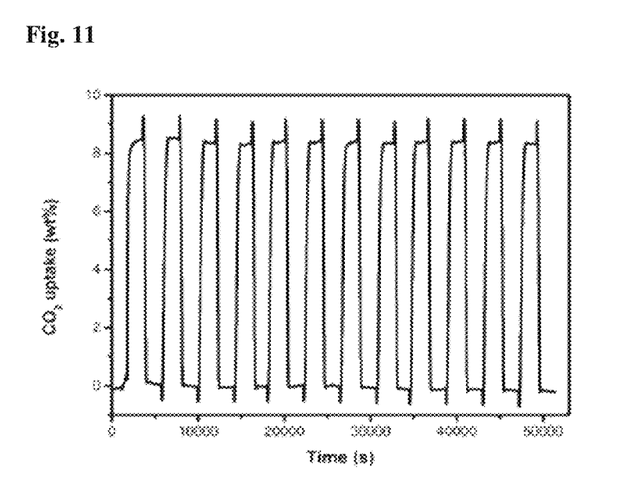
FIG. 11 shows time-dependent changes in the weight of an adsorbent of Example 3 in which a polyethyleneimine modified by partial substitution with butylene oxide was supported on a borosilicate, during 12 consecutive TSA cycles (adsorption: 15% CO$_2$, 3% H$_2$O, 2% Ar in N$_2$ balance at 40° C.; adsorbent regeneration: 100% CO$_2$ at 120° C.) determined by thermogravimetric analysis (TGA)

The long-term stability of the adsorbent including the polyethyleneimine modified by partial substitution that was supported on the borosilicate (0.35EB-PEI/Borosilicate) was investigated by thermogravimetric analysis (TGA). First, gases adsorbed to the adsorbent surface were desorbed using 100% $N_2$ at 100° C. for 1 h. Thereafter, carbon dioxide was adsorbed at 15% $CO_2$, 3% $H_2O$, 2% Ar in $N_2$ balance at 40° C. for 30 min, which are conditions similar to those of actual processes, and the adsorbed carbon dioxide was desorbed (adsorbent renerated) at 100% $CO_2$ at 120° C. for 30 min. The adsorbent including the polyethyleneimine modified by partial substitution with butylene oxide that was supported on the borosilicate (0.35EB-PEI/Borosilicate) was subjected to 12 consecutive TSA cycles proceeded, the adsorbent showed good long-term stability, which was confirmed by thermogravimetric analysis. The results are shown in FIG. 11.

Example 4: Preparation of $CO_2$ Adsorbent Including Polyethyleneimine Modified by Partial Substitution with Butylene Oxide and (3-Glycidyloxypropyl)Trimethoxysilane that was Supported on Silica and Temperature Swing Adsorption (TSA) Experiment First, a polyethyleneimine modified by partial substitution with butylene oxide and (3-glycidyloxypropyl)trimethoxysilane (GTMS) was synthesized. Specifically, 2 g of a polyethyleneimine (Mn=1200, 19 mmol N/g) was dissolved in 10 g of methanol at 298 K. The solution was stirred at a constant rate of 400 rpm for 10 min. To the stirred polyethyleneimine/methanol solution was added butylene oxide in an amount such that the mole ratio of the butylene oxide to the nitrogen (N) atoms present in the polyethyleneimine were 0.26:1. The mixture was stirred at 400 rpm for 12 h to obtain a methanolic solution of a polyethyleneimine modified by partial substitution with butylene oxide. Thereafter, (3-glycidyloxypropyl)trimethoxysilane was added in an amount such that the mole ratio of the (3-glycidyloxypropyl)trimethoxysilane to the nitrogen (N) atoms present in the polyethyleneimine was 0.09:1. The mixture was stirred at a rate of 400 rpm for additional 12 h to obtain a methanolic solution of a polyethyleneimine modified by partial substitution with butylene oxide and (3-glycidyloxypropyl)trimethoxysilane.

Thereafter, the polyethyleneimine modified by partial substitution with butylene oxide and (3-glycidyloxypropyl)trimethoxysilane was supported in an amount of 50 wt %, based on the total weight of the final adsorbent. Specifically, 2.96 g of fumed silica was added to the methanolic solution of the polyethyleneimine modified by partial substitution with butylene oxide and (3-glycidyloxypropyl)trimethoxysilane. The mixture was sufficiently stirred for 2 h such that the solution of the polyethyleneimine modified by partial substitution was sufficiently loaded into the pores of the fumed silica. The mixture was heated in a vacuum oven at 50° C. for 12 h to remove the solvent. The resulting adsorbent modified by partial substitution with butylene oxide and (3-glycidyloxypropyl)trimethoxysilane that was supported on silica was referred to as "0.26EB-0.09GTMS-PEI/$SiO_2$".

Figure 12:
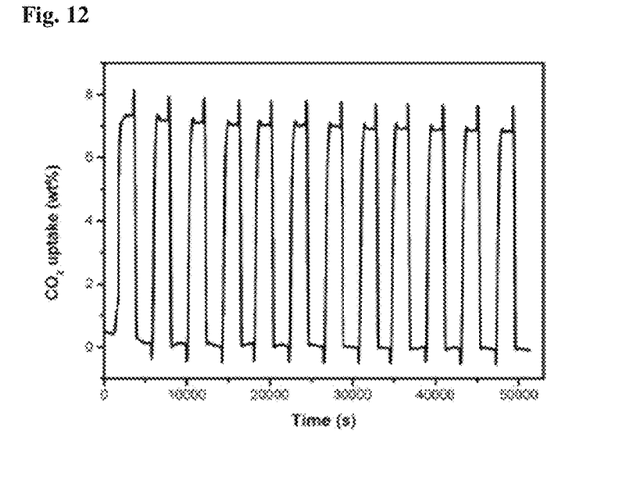
FIG. 12 shows time-dependent changes in the weight of an adsorbent of Example 4 in which a polyethyleneimine modified by partial substitution with butylene oxide and (glycidyloxypropyl)trimethoxysilane was supported on fumed silica, during 12 consecutive TSA cycles (adsorption: 15% CO$_2$, 3% H$_2$O, 2% Ar in N$_2$ balance at 40° C.; adsorbent regeneration: 100% CO$_2$ at 120° C.) determined by thermogravimetric analysis (TGA)

The long-term stability of the adsorbent including the polyethyleneimine modified by partial substitution with butylene oxide and (3-glycidyloxypropyl)trimethoxysilane that was supported on silica (0.26EB-0.09GTMS-PEI/$SiO_2$) was investigated by thermogravimetric analysis (TGA). First, gases adsorbed to the adsorbent surface were desorbed using 100% $N_2$ at 100° C. for 1 h. Thereafter, carbon dioxide was adsorbed at 15% $CO_2$, 3% $H_2O$, 2% Ar in $N_2$ balance at 40° C. for 30 min, which are conditions similar to those of actual processes, and the adsorbed carbon dioxide was desorbed (adsorbent renerated) at 100% $CO_2$ at 120° C. for 30 min. The adsorbent including the polyethyleneimine modified by partial substitution with butylene oxide and (3-glycidyloxypropyl)trimethoxysilane that was supported on silica (0.26EB-0.09GTMS-PEI/$SiO_2$) was subjected to 12 consecutive TSA cycles. As the cycles proceeded, the adsorbent showed good long-term stability, which was confirmed by thermogravimetric analysis. The results are shown in FIG. 12.

Example 5: Preparation of Carbon-Silica Composite by Coating of Solid Carbon Black on the Adsorbent Including the Polyethyleneimine-Supported Silica The adsorbent EB-PEI/$SiO_2$ prepared in Example 2 was coated with carbon black by the following procedure. Carbon black was added to coat the adsorbent EB-PEI/$SiO_2$. The carbon black was used in an amount of 2 wt %, based on the total weight of the adsorbent. The mixture was stirred by rotatory tumbling for 12 h to produce a composite in which the carbon black was coated on the surface of EB-PEI/$SiO_2$.

Thereafter, the carbon black remaining unattached to the surface of EB-PEI/$SiO_2$ was removed with a sieve having mesh sizes of 200 μm (top) and 53 μm (bottom). The composite was sprayed on the top of the sieve and vibration was applied to the sieve.

The carbon black unattached to the surface of EB-PEI/$SiO_2$ was collected in the bottom of the sieve and the carbon-coated carbon-silica composite remained on the top of the sieve. The composite was referred to as "CB-PEI/$SiO_2$".

Example 6: Evaluation of Physicochemical Properties of the Carbon-Silica Composite The physicochemical properties of CB-PEI/$SiO_2$ prepared in Example 5 were evaluated by the following procedure. The results are shown in FIGS. 13 and 14.

Figure 13:
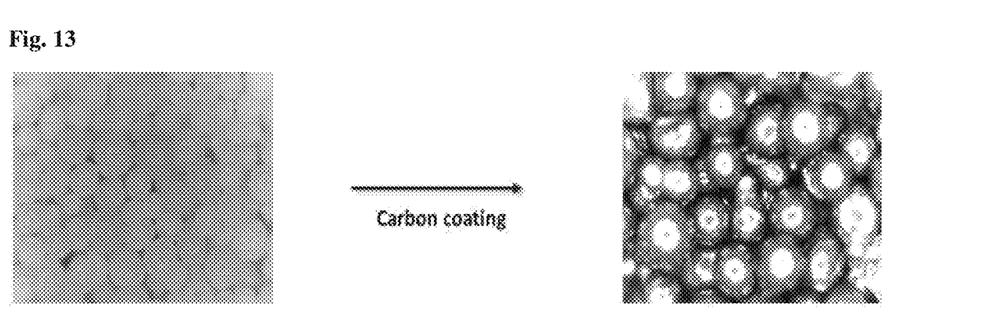
FIG. 13 shows microscope images of EB-PEI/Silica prepared in Example 2 and CB-PEI/SiO$_2$ prepared using EB-PEI/Silica in Example 5.

FIG. 13 shows microscope images of EB-PEI/$SiO_2$ prepared in Example 2 and CB-PEI/$SiO_2$ prepared in Example 5. The right microscope image reveals that the surface of CB-PEI/$SiO_2$ was uniformly coated with solid carbon black.

Figure 14:
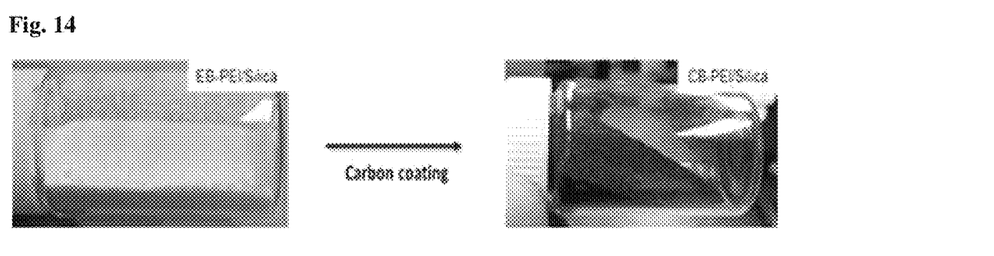
FIG. 14 shows images of EB-PEI/Silica prepared in Example 2 and CB-PEI/SiO$_2$ prepared using EB-PEI/Silica in Example 5 to reveal indirect experimental results for electrostatic characteristics.

FIG. 14 shows images of EB-PEI/$SiO_2$ prepared in Example 2 and CB-PEI/$SiO_2$ prepared in Example 5. The images reveal indirect experimental results for the electrostatic characteristics of the adsorbent and the composite. The indirect experiment was conducted by shaking EB-PEI/$SiO_2$ and CB-PEI/$SiO_2$ (each 5 g) in 20 ml vials for 1 min. Thereafter, the amounts of the adsorbent and the composite attached to the inner glass walls of the vials were measured. The left image reveals that many particles of the uncoated sample EB-PEI/Silica were attached to the inner glass wall of the vial. In contrast, the right image reveals that most of the particles of the solid carbon black-coated sample CB-PEI/Silica did not remain on the inner glass wall of the vial.

Although the particulars of the present disclosure have been described in detail, it will be obvious to those skilled in the art that such particulars are merely preferred embodiments and are not intended to limit the scope of the present disclosure. Therefore, the true scope of the present disclosure is defined by the appended claims and their equivalents.

What is claimed is:

1. A carbon dioxide adsorbent comprising: a polymeric amine consisting of a polymer skeleton containing nitrogen atoms and branched chains bonded to the nitrogen atoms of the polymer skeleton, each branched chain containing at least one nitrogen atom; and a porous support on which the polymeric amine is supported, wherein the polymeric amine is modified by substitution of at least one of the nitrogen atoms of the polymer skeleton or the branched chains with a hydroxyl group-containing carbon chain.

2. The carbon dioxide adsorbent according to claim 1, wherein the polymeric amine has a polyalkyleneimine basic structure.

3. The carbon dioxide adsorbent according to claim 1, wherein the polymeric amine has a polyethyleneimine basic structure.

4. The carbon dioxide adsorbent according to claim 1, wherein the polymer skeleton has a repeating unit structure represented by —$[(CH_2)_x—NR]_y$— (where R is hydrogen or a branched chain, x is from 2 to 6, and y representing the average number of repeating units in the linear polyalkyleneimine chain is from 5 to 100) and the branched chain has an alkyleneamine structure represented by —$(CH_2)_x$—$NH_2$ or an alkyleneimine structure represented by —$(CH_2)_x$—$NR'_2$ (where one of the R's is an alkyleneamine or alkyleneimine group and the other R' is hydrogen, an alkyleneamine group or an alkyleneimine group).

5. The carbon dioxide adsorbent according to claim 1, wherein the hydroxyl group-containing carbon chain has 1 to 20 carbon atoms and contains 1 to 10 hydroxyl groups.

6. The carbon dioxide adsorbent according to claim 1, wherein the hydroxyl group-containing carbon chain has a structure represented by —$(CH_2)_m(OH)_nL$ (where m is an integer from 1 to 20, n is an integer from 1 to 10, and L is hydrogen, $C_1$-$C_{18}$ alkyl, $C_3$-$C_{10}$ cycloalkyl, $C_1$-$C_{18}$ alkoxy, —CH=$CH_2$, —CH=$CHCH_2CH_3$, —$CH_2$CH=$CHCH_3$, —$CH_2CH_2$CH=$CH_2$, —CH=$CHCH_2CH_2CH_2CH_3$, —$CH_2$CH=$CHCH_2CH_2CH_3$, —$CH_2CH_2$CH=$CHCH_2CH_3$, —$CH_2CH_2CH_2$CH=$CHCH_3$, —$CH_2CH_2CH_2CH_2$CH=$CH_2$, —CH=$CHCH_2CH_2CH_2CH_2CH_2CH_3$, —$CH_2$CH=$CHCH_2CH_2CH_2CH_2CH_3$, —$CH_2CH_2$CH=$CHCH_2CH_2CH_2CH_3$, —$CH_2CH_2CH_2$CH=$CHCH_2CH_2CH_3$, —$CH_2CH_2CH_2CH_2$CH=$CHCH_2CH_3$, —$CH_2CH_2CH_2CH_2CH_2$CH=$CHCH_3$, —$CH_2CH_2CH_2CH_2CH_2CH_2$CH=$CH_2$, —$CH_2O(CH_2)_3Si(OCH_3)_3$, —$CH_2O(CH_2)_3Si(OCH_2CH_3)_3$, —$CH_2O(CH_2)_2CH_3$, —$CH_2O(CH_2)_3CH_3$, —$CH_2OCH$=$CHCH_3$ or —$CH_2OCH_2$CH=$CH_2$).

7. The carbon dioxide adsorbent according to claim 1, wherein the polymeric amine has a weight average molecular weight of 200 to 150,000.

8. A core-shell structured carbon dioxide adsorbent in which the core comprises a polymeric amine consisting of a polymer skeleton containing nitrogen atoms and branched chains bonded to the nitrogen atoms of the polymer skeleton, each branched chain containing at least one nitrogen atom, and a porous support on which the polymeric amine is supported, and the shell comprises a conductive carbon material layer surrounding and coated on the core wherein the polymeric amine is modified by substitution of at least one of the nitrogen atoms of the polymer skeleton or the branched chains with a hydroxyl group-containing carbon chain.

9. The carbon dioxide adsorbent according to claim 8, wherein the conductive carbon material is selected from the group consisting of carbon black, graphite, activated carbon, carbon nanotubes, graphene, carbon filaments, and mixtures thereof.

10. A polymeric amine consisting of a polymer skeleton containing nitrogen atoms and branched chains bonded to the nitrogen atoms of the polymer skeleton, each branched chain containing at least one nitrogen atom, wherein the polymeric amine is modified by substitution of at least one of the nitrogen atoms of the polymer skeleton or the branched chains with a hydroxyl group-containing carbon chain and wherein the hydroxyl group-containing carbon chain is a functional group derived from the ring-opening reaction of an oxide derivative and has a structure represented by —$(CH_2)_m(OH)_nL$ (where m is an integer from 1 to 20, n is an integer from 1 to 10, and L is hydrogen, $C_1$-$C_{18}$ alkyl, $C_3$-$C_{10}$ cycloalkyl, $C_1$-$C_{18}$ alkoxy, —CH=$CH_2$, —CH=$CHCH_2CH_3$, —$CH_2$CH=$CHCH_3$, —$CH_2CH_2$CH=$CH_2$, —CH=$CHCH_2CH_2CH_2CH_3$, —$CH_2$CH=$CHCH_2CH_2CH_3$, —$CH_2CH_2$CH=$CHCH_2CH_3$, —$CH_2CH_2CH_2$CH=$CHCH_3$, —$CH_2CH_2CH_2CH_2$CH=$CH_2$, —CH=$CHCH_2CH_2CH_2CH_2CH_2CH_3$, —$CH_2$CH=$CHCH_2CH_2CH_2CH_2CH_3$, —$CH_2CH_2$CH=$CHCH_2CH_2CH_2CH_3$, —$CH_2CH_2CH_2$CH=$CHCH_2CH_2CH_3$, —$CH_2CH_2CH_2CH_2$CH=$CHCH_2CH_3$, —$CH_2CH_2CH_2CH_2CH_2$CH=$CHCH_3$, —$CH_2CH_2CH_2CH_2CH_2CH_2$CH=$CH_2$, —$CH_2O(CH_2)_3Si(OCH_3)_3$, —$CH_2O(CH_2)_3Si(OCH_2CH_3)_3$, —$CH_2O(CH_2)_2CH_3$, —$CH_2O(CH_2)_3CH_3$, —$CH_2OCH$=$CHCH_3$ or —$CH_2OCH_2$CH=$CH_2$).

11. The polymeric amine according to claim 10, wherein 10-90% of all nitrogen atoms in the polymeric amine are present in the form of unmodified primary or secondary amine groups.

12. The polymeric amine according to claim 10, wherein the polymer skeleton has a polyalkyleneimine basic structure whose repeating unit structure is represented by —$[(CH_2)_x$—$NR]_y$— (where R is hydrogen or a branched chain, x is from 2 to 6, y representing the average number of repeating units in the linear polyalkyleneimine chain is from 5 to 100, provided that when R is hydrogen, the repeating unit structure is a secondary amine moiety).

13. The polymeric amine according to claim 10, wherein the branched chain has an alkyleneamine structure represented by —$(CH_2)_x$—$NH_2$ or an alkyleneimine structure represented by —$(CH_2)_x$—$NR'_2$ (where one of the R's is an alkyleneamine or alkyleneimine group and the other R' is hydrogen, an alkyleneamine group or an alkyleneimine group).

14. The polymeric amine according to claim 10, wherein when the branched chain is a primary amine group represented by —$(CH_2)_x$—$NH_2$, the repeating unit structure bonded with the branched chain is a tertiary amine moiety.

15. The polymeric amine according to claim 10, wherein the branched chain has an alkyleneimine structure represented by —$(CH_2)_x$—$NR'_2$ (wherein one of the R's is an alkyleneamine or alkyleneimine group and the other R' is hydrogen, an alkyleneamine group or an alkyleneimine group, provided that i) when the other R' is hydrogen, the repeating unit structure bonded with the branched chain is a tertiary amine moiety and the branched chain is a secondary amine group, ii) when the other R' is an alkyleneamine group, the repeating unit structure bonded with the branched chain is a tertiary amine moiety, the branched chain is a tertiary amine group, and the alkyleneamine group is a primary amine group, and iii) when the other R' is an alkyleneimine group, the repeating unit structure bonded with the branched chain is a tertiary amine moiety, the branched chain is a tertiary amine group, and the alkyleneimine group is a secondary or tertiary amine group).

* * * * *